(12) United States Patent
Silverstein et al.

(10) Patent No.: US 11,769,300 B2
(45) Date of Patent: Sep. 26, 2023

(54) AUGMENTED REALITY GUIDANCE OVERLAP

(71) Applicant: Kyndryl, Inc., New York, NY (US)

(72) Inventors: Michael Seth Silverstein, Jacksonville, FL (US); Zachary A. Silverstein, Georgetown, TX (US); Jacob Ryan Jepperson, St. Paul, MN (US)

(73) Assignee: Kyndryl, Inc., New York, NY (US)

( * ) Notice: Subject to any disclaimer, the term of this patent is extended or adjusted under 35 U.S.C. 154(b) by 58 days.

(21) Appl. No.: 17/399,092

(22) Filed: Aug. 11, 2021

(65) Prior Publication Data

US 2023/0046566 A1 Feb. 16, 2023

(51) Int. Cl.
| | |
|---|---|
| *G06F 16/735* | (2019.01) |
| *G06V 20/20* | (2022.01) |
| *G06T 19/00* | (2011.01) |
| *G06T 15/00* | (2011.01) |
| *G06F 16/78* | (2019.01) |
| *G06F 16/783* | (2019.01) |

(52) U.S. Cl.
CPC ............ *G06T 19/003* (2013.01); *G06F 16/735* (2019.01); *G06F 16/7844* (2019.01); *G06F 16/7867* (2019.01); *G06T 15/005* (2013.01); *G06V 20/20* (2022.01)

(58) Field of Classification Search
CPC ... G06T 19/003; G06F 16/735; G06F 16/7844; G06F 16/7867; G06T 15/005; G06V 20/20
See application file for complete search history.

(56) References Cited

U.S. PATENT DOCUMENTS

| 7,466,334 B1 | 12/2008 | Baba |
| 10,586,469 B2 | 2/2017 | Belch et al. |

(Continued)

FOREIGN PATENT DOCUMENTS

KR 20030024227 A 3/2003

OTHER PUBLICATIONS

"Cognitive AR in Action - Assistance and Training Workstation", YouTube, Jun. 30, 2019, 3 pages, <https://www.youtube.com/watch?v=pC7tzBNTWw4>.
"Computer Vision and Augmented Reality", Downloaded May. 4, 2021, 15 pages, <https://www.research.ibm.com/haifa/dept/imt/cvar/index.html>.
"How to Create a 3D Model from any YouTube Video using Photogrammetry," May. 10, 2016, 2 pages, <http://thehightechhobbyist.com/3d-model-from-any-youtube-video/>.

(Continued)

*Primary Examiner* — Jitesh Patel
(74) *Attorney, Agent, or Firm* — Erik Swanson, Esq.; Kevin P. Radigan, Esq.; HESLIN ROTHENBERG FARLEY & MESITI P.C.

(57) ABSTRACT

Embodiments of the present invention provide computer-implemented methods, computer program products and computer systems. Embodiments of the present invention can, in response to receiving a request, identify a core component from source material based on topic analysis. Embodiments of the present invention can then generate three-dimensional representations of physical core components associated with the request. Finally, embodiments of the present invention then render the generated three-dimensional representations of the physical core components over the physical core components.

20 Claims, 3 Drawing Sheets

(56) References Cited

U.S. PATENT DOCUMENTS

| | | | |
|---|---|---|---|
| 2004/0114033 | A1 | 6/2004 | John et al. |
| 2013/0278635 | A1* | 10/2013 | Maggiore ............ G06F 3/0304 345/633 |
| 2016/0371992 | A1 | 12/2016 | Kozloski et al. |
| 2019/0147655 | A1* | 5/2019 | Galera et al. .......... G06T 15/20 345/419 |
| 2019/0244179 | A1 | 8/2019 | Kim et al. |
| 2020/0004893 | A1* | 1/2020 | Bernardon et al. ...... A43D 8/26 |
| 2020/0035030 | A1 | 1/2020 | Schradin et al. |

OTHER PUBLICATIONS

"IBM Research Augmented Reality for Field Technicians", Downloaded May. 4, 2021, 3 pages, <https://www.research.ibm.com/haifa/projects/imt/ar-maintenance-app/index-app.html>.

"Video Drawables", Wikitude, © 2012-2019, 9 pages, <https://www.wikitude.com/documentation/latest/android/workingwithvideos.html>.

"Watson Media Live Streaming and Video Hosting Solutions", Downloaded May. 4, 2021, 8 pages, <https://www.ibm.com/watson/media>.

Ergu, Nursah, "Nvidia Researchers Created AI That Turns 2D Images into 3D Models", Dec. 10, 2019, 8 pages, <https://interestingengineering.com/nvidia-researches-created-ai-that-turns-2d-images-into-3d-models>.

Mijakovska et al., "Generating 3D Model from Video," Advanced Computing: An International Journal (ACIJ), Dec. 2014, DOI: 10.5121/acij.2014.5602, 8 pages.

Revell, Timothy, "App creates augmented-reality tutorials from normal videos," New Scientist, Sep. 11, 2017, 2 pages, < https://www.newscientist.com/article/2146850-app-creates-augmented-reality-tutorials-from-normal-videos/>.

Teich, David A., "IBM Augmented Reality Working To Support And Accelerate How Support Services Are Changing", Apr. 28, 2020, 5 pages, <https://www.forbes.com/sites/davidteich/2020/04/28/ibm-augmented-reality-working-to-support-and-accelerate-how-support-services-are-changing/?sh=2e2ae0212c56>.

* cited by examiner

AUGMENTED REALITY GUIDANCE OVERLAP

BACKGROUND

The present invention relates in general to augmented reality and in particular to augmented reality guidance overlap within electronic devices Augmented reality (AR) generally refers to an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e., additive to the natural environment), or destructive (i.e., masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

Video tutorials typically help users learn about a given subject. Generally, video tutorials are accessed via a Uniform Resource Locator (URL) and enable users to learn in a manner different than printed materials. Typically, video tutorials can be classified as guided tours and "how-to" videos. Guided tours are typically designed to raise the public understanding of topic/subject by simulating interactions a user can perform using a given interface. How-to videos are video tutorials that are aimed at explaining basic features of a resource.

SUMMARY

According to an aspect of the present invention, there is provided a computer-implemented method. The computer implemented method comprises: in response to receiving a request, identifying a core component from source material based on topic analysis; generating three-dimensional representations of physical core components associated with the request; and rendering the generated three-dimensional representations of the physical core components over the physical core components.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize there are two common forms for video tutorials. Guided video tours are typically designed to raise the public understanding of topic/subject by simulating interactions a user can perform using a given interface while "how-to" videos are video tutorials that are aimed at explaining basic features of a resource. As such, embodiments of the present invention recognize certain deficiencies with video tutorials. For example, video tutorials are limited to the perspective filmed by the uploading user. Therefore, users viewing the video may have obscured portions that are not shown in the video tutorial that could be helpful. Specifically, in an example where the "how to tutorial" shows an assembly of parts, the "how to tutorial" may not show a perspective that show how to rotate an object to lock into place.

In another example, tutorial content on websites can illustrate how to unscrew special screws in a certain way, change oil on a vehicle, or learn how to use special equipment. Embodiments of the present invention recognize that typically users watch a video and attempt that action yourself while replaying the video multiple times. Embodiments of the present invention recognize that replaying the video multiple times helps the user understand the activity and helps instruct the user. Embodiments of the present invention recognize deficiencies with this method. AS such, embodiments of the present invention seek to optimize presentation of tutorial content. Specifically, embodiments of the present invention optimize presentation of tutorial content by generating graphics for a user display (e.g., augmented reality) that depict one or more three-dimensional representations of objects the user is viewing that can be manipulated to depict multiple viewpoints despite only having a single viewpoint as a reference (e.g., the single viewpoint of the user uploading the tutorial content) as described in greater detail later in this Specification.

Figure 1:
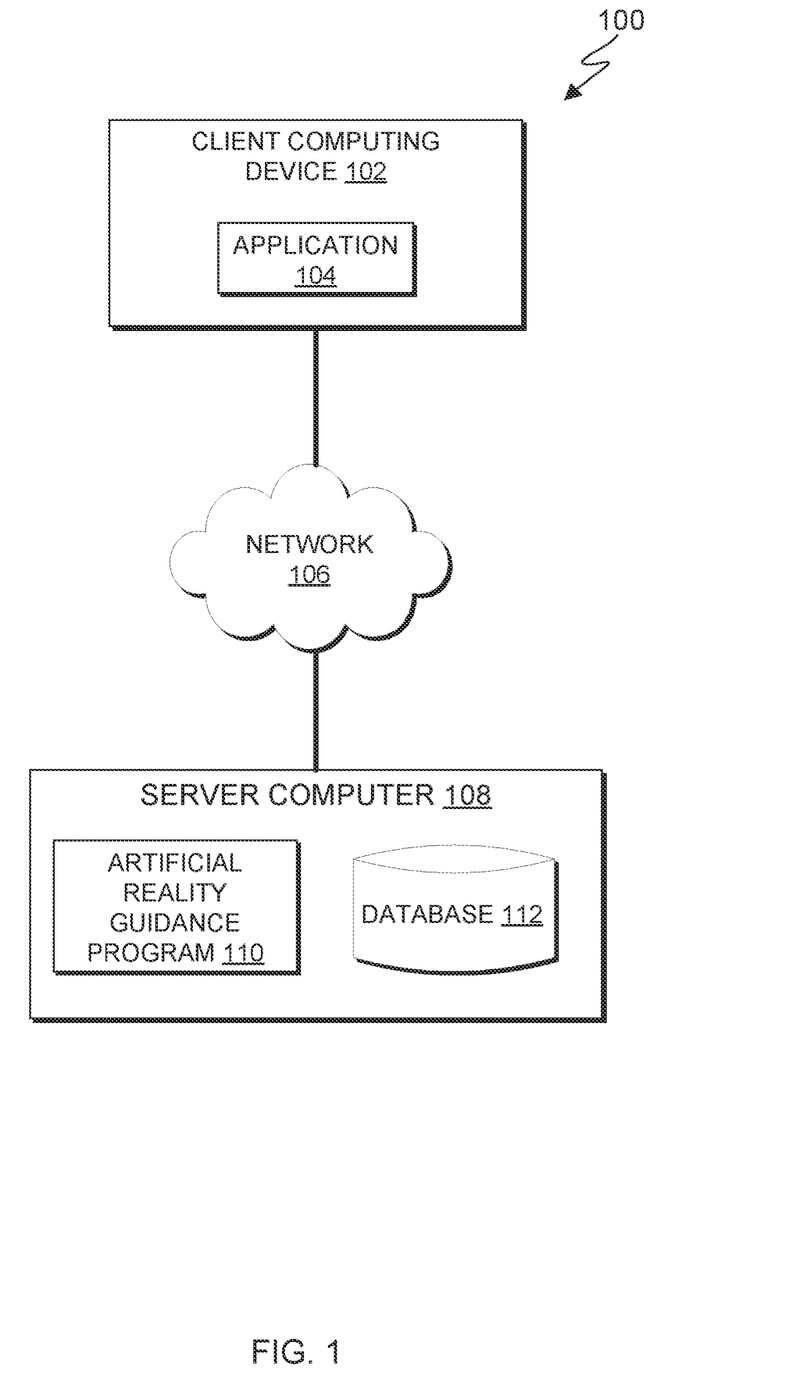
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computers as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 3.

In this embodiment, client computing device 102 is a user device associated with a user and includes application 104. Application 104 communicates with server computer 108 to access artificial reality guidance program 110 (e.g., using TCP/IP) to access content, user information, and database information. Application 104 can further communicate with artificial reality guidance program 110 to identify core components of one or more objects depicted in a tutorial, generate 3D representations based on the identified core components, and render the 3D representations, as discussed in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts artificial reality guidance program 110 and database 112. In this embodiment, artificial reality guidance program 110 resides on server computer 108. In other embodiments, artificial reality guidance program 110 can have an instance of the program (not shown) stored locally on client computer device 102. In other embodiments, artificial reality guidance program 110 can be a standalone program or system that can, in response to receiving a request, identify core components of one or more objects depicted in a tutorial, generate 3D representations based on the identified core components, and render the 3D representations. In this embodiment a request can include one or more characters that act as a search query. In some instances, a request can include a textual description of desired content and accompanying source material. In yet other embodiments, artificial reality guidance program 110 can be stored on any number or computing devices.

Artificial reality guidance program 110 generates one or more graphics and renders 3D representations on one or more user devices that can depict multiple viewpoints beyond what is provided by source material. Source material, as used herein refers to content depicted in at least a single media source (e.g., audio, video, pictorial, etc.). In some embodiments, source material can be streamed from a website or loaded into artificial reality guidance program 110 as a media file. In some instances, source material can include accompanying metadata (e.g., textual information indicating location, timestamps, etc.) Typically, source material refers to content depicting a tutorial (e.g., guided or how-to). For example, content depicting could display assembly of an item (e.g., object) or disassembly. Content depicted could show performance of an action, that is, depicting one or more movements that accomplish a result (e.g., a golf swing, a plank hold, a jump, perform a movement in a video game, etc.). In other embodiments, source material can refer to content depicting an object and parts of the object. For example, source material can display a car and components thereof (e.g., exterior, interior, engine bay, etc.) with or without commentary of a presenter uploading the source material.

In another example, source material can present a video tutorial on how to dig a drainage trench. Content depicted in the source material could feature a component about replacing a trencher head on machinery required to dig the drainage trench and depict components and commentary on how to unscrew a specific knob counter (e.g., rotate the knob counterclockwise, pull it, press a button, and then remove the entire component). Prior to loading this source material to artificial reality guidance program 110, a user would typically watch the video multiple times to replicate the actions, that is, series of movements (e.g., unscrewing a specific knob counter).

Continuing the above- example, artificial reality guidance program 110 could access the source material (e.g., either automatically with permissioned access or via manual user upload) and a module of artificial reality guidance program 110 (not shown) identifies core interacted components. Identified core interacted components refers to one or more components of an object depicted in the source material. Continuing the above example, involving a knob counter and how to replace the knob counter, artificial reality guidance program 110 identifies the specific knob counter, button, and screws as core components.

In this embodiment, artificial reality guidance program 110 can use topic analysis and object recognition to identify core components of the source material. Additionally, artificial reality program 110 can also scan or otherwise identify core components from a physical object (e.g., can receive a scan of a physical object such as turbocharger). In some embodiments, artificial reality guidance program 110 can generate a search query for additional source material based on an identified core component from either the source material or from an identified physical component associated with a user and subsequently search for the additional source material that matches the search query.

Artificial reality guidance program 110 can then generate graphics for each of the identified core components and replicate those core components and respective angles in either two-dimensional (2D), 2.5 dimensional (e.g., a hybrid), and three dimensional (3D) based on angles identified in the source material. Artificial reality guidance program 110 can then render the generated graphics in a user interface such that the user can manipulate the generated graphics to enable a user to mimic the actions depicted by the generated graphics. For example, artificial reality guidance program 110 can overlay the 3D representations of the knob counter over the placement of the user's hand and play the series of actions depicted in the source material until the series of actions are completed, that is, until the user performs the actions and removes the knob counter.

In some embodiments, artificial reality guidance program 110 can generate movement for or otherwise move the generated graphics to mimic the content shown of in the source material. For example, source material can show a two-dimensional video shown on the user's phone depicting an installation of an air filter. Artificial reality guidance program 110 can generate graphics for the air filter, the air filter's housing, and screws used to secure the air filter housing. Artificial reality guidance program 110 can then display these graphics in an Augmented Reality user interface (e.g., smart glasses), orienting the generated graphics to be overlaid on top of the physical air filter, air filter housing and screws used to secure the air filter housing. In certain embodiments, artificial reality guidance program 110 can generate additional graphics to highlight certain core components.

For example, in some embodiments, artificial reality guidance program 110 can generate a color that highlights the outline of the generated graphic for the air filter housing. In some embodiments, artificial reality guidance program 110 can generate a graphic depicting an arrow to point out the air filter housing. In some embodiments, artificial reality guidance program 110 can generate these additional graphics to show when a presenter of the source material mentions these components. Finally, artificial reality guidance program 110 can then recreate the movement shown (e.g., replacement of the air filter) in the source material. In certain embodiments, artificial reality guidance program 110 can be paused (e.g., such that the generated graphics are out of sync with the source material) and allow the user to manipulate the generated graphic without the aid or playback of the source material.

In certain embodiments, artificial reality guidance program 110 can, after identifying core components from the source material perform another search for other source material to refine the graphics and respective angles it generates. For example, artificial reality guidance program 110 can identify that core components from the source material differ from core components held by the user. For example, artificial reality guidance program 110 can identify the model depicted in the core components of the source material is a previously version (e.g., model B8) versus the model possessed by the user (e.g., model B9). Accordingly, artificial reality guidance program 110 can search one or more additional databases for source material that matches the core components held by the user. In some embodiments, artificial reality guidance program 110 can upscale or downscale the quality of graphics displayed based on the resolution of the source material.

In this embodiment, artificial guidance program 110 can provide a feedback mechanism to continually adjust graphics overlaid over the user's screen. For example, artificial reality guidance program 110 can receive feedback that the user is rotating clockwise. Artificial reality guidance program 110 can then generate another graphic that alerts the user to the improper action followed by yet another graphic showing directional information for the user to follow (e.g., rotate counterclockwise). In certain embodiments, artificial guidance program 110 can adjust the graphics depicted in the user interface (e.g., augmented reality) to match the user's movements and positions.

Database 112 stores received information and can be representative of one or more databases that give permissioned access to artificial reality guidance program 110 or publicly available databases. For example, database 112 can store received source material, depicted graphics, search parameters, audio, descriptions associated with the source material, interaction components, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
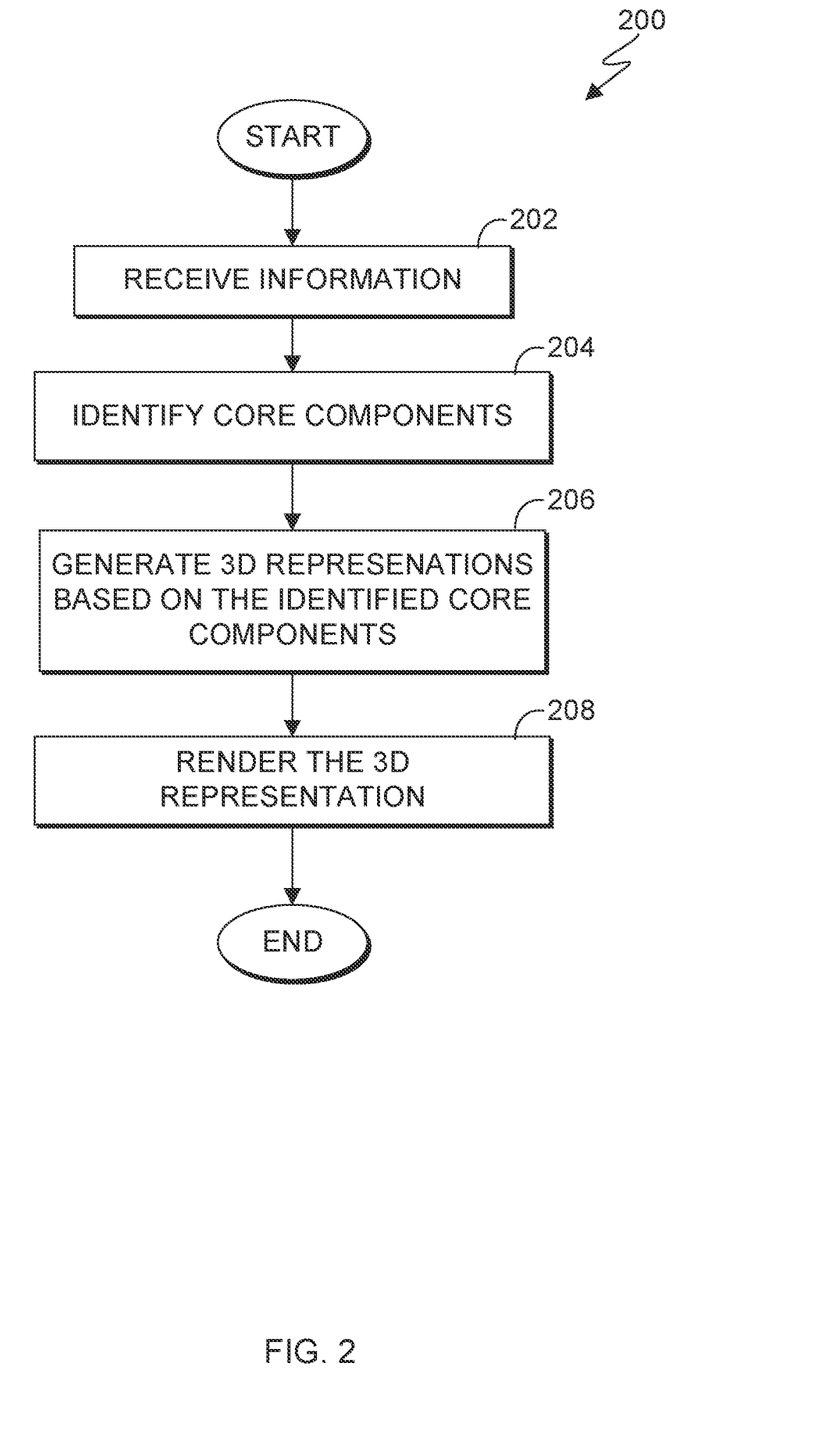
FIG. 2 is a flowchart depicting operational steps generating 3D representations of core components, in accordance with an embodiment of the present invention.

FIG. 2 is a flowchart 200 depicting operational steps generating 3D representations of core components, in accordance with an embodiment of the present invention.

In step 202, artificial reality guidance program 110 receives information. In this embodiment, the received information can include a request from client computing device 102 for a tutorial. In other embodiments, the information received may be a request to identify source material for artificial reality guidance program 110. In other embodiments, artificial reality guidance program 110 can receive information from one or more other components of computing environment 100.

In some embodiments, the source material can include media files (e.g., audio, text, visual, etc.). Information received can further include search parameters, textual descriptions of the source material, and one or more interaction components. In some embodiments, artificial reality guidance program 110 may receive user preferences (e.g., via manual input). For example, artificial reality guidance program 110 may receive user preferences that specify the desired item and using item permanence. Source material can, in some cases may include user location information. In some embodiments the user may designate the desired item and using item permanence/persistence the core component is extracted. For example, a user may scan a background associated with the user (e.g., the user's workbench) and associated objects (e.g., a turbocharger). Artificial reality guidance program 110 can then identify one or more core components and search for additional source material matching the identified one or more core components.

In step 204, artificial reality guidance program 110 identifies core components from the source material. In this embodiment, artificial reality guidance program 110, identifies core components from the source material by analyzing the source material. Artificial reality guidance program 110 can then perform topical analysis to identify one or more core components using a combination of natural language processing and object recognition technology. For example, artificial reality guidance program 110 can leverage natural language processing and object recognition to extract frames from source material (e.g., tutorial videos). In some instances, artificial reality guidance program 110 can use a convolutional neural network (CNN) or manually trained corpus to identify the underlying component. For example, artificial reality guidance program 110 can leverage TensorFlow. In this manner, artificial reality guidance program 110 can identify what the user depicted in the source material is, and movements performed by the user (e.g., user interaction with one or more objects such as a part and any other tools the user might be using). Artificial reality guidance program 110 can also determine relative sizes of objects depicted in the source material, orientation, depth, etc.

In step 206, artificial reality guidance program 110 generates three-dimensional representations based on the identified core components. In this embodiment, artificial reality guidance program 110 generates three-dimensional representations by utilizing core components (e.g., relative size, orientation, depth, images wrapped around a to-size 3D model of what the component may look like, etc.). In some embodiments, artificial reality guidance program 110 may receive two dimensional images as source material. In these circumstances, artificial reality guidance program 110 may search for additional source material and construct a three-dimensional representation from the two-dimensional image it initially received. In other instances, artificial reality guidance program 110 can construct hybrid representations, that is, in certain circumstances, artificial reality guidance program 110 can recreate one or more portions of the source material in varying dimensions (e.g., 2D, two and a half (2.5D), that is, viewing a piece from a specific angle/side, and 3D).

In step 208, artificial reality guidance program 110 renders the three-dimensional representations. In this embodiment, artificial reality guidance program 110 overlays the three-dimensional representations over the physically present object. In some embodiments, artificial reality guidance program 110 can render the three-dimensional representation in a user interface (e.g., smart glasses) such that the user can see the 3D model overlaid on top of the user's physical object and replay the manipulation of the 3D model such that the movements mimic the source materials movements (e.g., replicate the source material's content). For example, where the source material depicts an action, that is, a series of movements to assemble a watch, artificial reality guidance program 110 can render 3D representations of core components of the user's physical watch (e.g., bezel, crown, case, etc.) over the physical components and replay (e.g., render 3D representations) movements depicted in the source material that show assembly of the physical contents.

In certain embodiments, artificial reality guidance program 110 may only render a certain portion of the source material overlaid over the user's physical object to depict only relevant series of movements. For example, where the user indicates struggling with unscrewing a screw for an oil change, artificial reality guidance program 110 replays on the portion of the source material depicting the action of unscrewing the screw.

Figure 3:
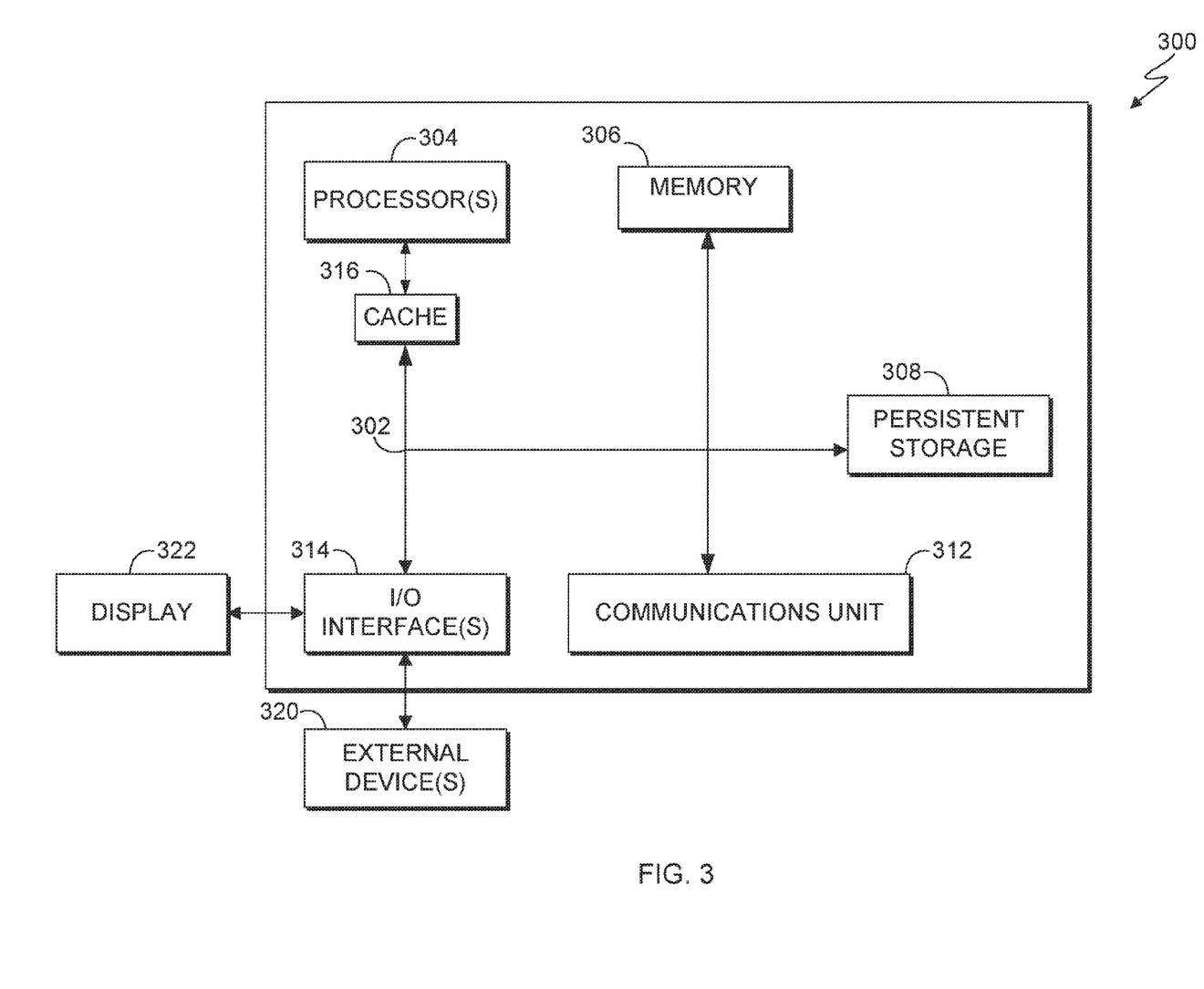
FIG. 3 is a block diagram of an example system, in accordance with an embodiment of the present invention.

FIG. 3 depicts a block diagram of components of computing systems within computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 300 includes communications fabric 302, which provides communications between cache 316, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Artificial reality guidance program 110 (not shown) may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Artificial reality guidance program 110 may be downloaded to persistent storage 508 through communications unit 312.

I/O interface(s) 314 allows for input and output of data with other devices that may be connected to client computing device and/or server computer. For example, I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., artificial reality guidance program 110, can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving a request, identifying a physical core component from source material based on topic analysis, the source material comprising content depicting a video tutorial, and the physical core component being recorded in the video tutorial from a single viewpoint;
   generating a three-dimensional representation of the physical core component associated with the request; and
   playing the video tutorial on a display and rendering the generated three-dimensional representation of the physical core component over the physical core component in the display of the video tutorial, wherein a user can manipulate the generated three-dimensional representation of the physical core component in the display of the video tutorial.

2. The computer-implemented method of claim 1, wherein the request includes search parameters received from the user.

3. The computer-implemented method of claim 1, wherein source material includes metadata associated with a media file, text descriptions associated with the media file, objects depicted in the media file, and interactions depicted in the media file.

4. The computer-implemented method of claim 1, further comprising:
   moving the generated three-dimensional representation corresponding to one or more interactions depicted in the video tutorial of the source material.

5. The computer-implemented method of claim 1, further comprising:

moving the generated three-dimensional representation corresponding to only a portion of interactions depicted in the video tutorial of the source material until such time when the user replicates the movements depicted in the source material.

6. The computer-implemented method of claim 1, further comprising:
generating a search query for additional source material based on an identified core component from either the source material or from an identified physical component associated with the user.

7. The computer-implemented method of claim 1, further comprising:
generating two and a half dimensional representations from the source material based on at least one identified core component.

8. A computer program product comprising:
one or more computer readable storage media and program instructions stored on the one or more computer readable storage media, the program instructions comprising:
program instructions to, in response to receiving a request, identify a physical core component from source material based on topic analysis, the source material comprising content depicting a video tutorial, and the physical core component being recorded in the video tutorial from a single viewpoint;
program instructions to generate a three-dimensional representation of the physical core component associated with the request; and
program instructions to play the video tutorial on a display and render the generated three-dimensional representation of the physical core component over the physical core component in the display of the video tutorial, wherein a user can manipulate the generated three-dimensional representation of the physical core component in the display of the video tutorial.

9. The computer program product of claim 8, wherein the request includes search parameters received from a user.

10. The computer program product of claim 8, wherein source material includes metadata associated with a media file, text descriptions associated with the media file, objects depicted in the media file, and interactions depicted in the media file.

11. The computer program product of claim 8, wherein the program instructions stored on the one or more computer readable storage media further comprise:
program instructions to move the generated three-dimensional representation corresponding to one or more interactions depicted in the video tutorial of the source material.

12. The computer program product of claim 8, wherein the program instructions stored on the one or more computer readable storage media further comprise:
program instructions to move the generated three-dimensional representation corresponding to only a portion of interactions depicted in the video tutorial of the source material until such time when the user replicates the movements depicted in the source material.

13. The computer program product of claim 8, wherein the program instructions stored on the one or more computer readable storage media further comprise:
program instructions to generate a search query for additional source material based on an identified core component from either the source material or from an identified physical component associated with the user.

14. The computer program product of claim 8, wherein the program instructions stored on the one or more computer readable storage media further comprise:
program instructions to generate two and a half dimensional representations from the source material based on at least one identified core component.

15. A computer system comprising:
one or more computer processors;
one or more computer readable storage media; and
program instructions stored on the one or more computer readable storage media for execution by at least one of the one or more computer processors, the program instructions comprising:
program instructions to, in response to receiving a request, identify a physical core component from source material based on topic analysis, the source material comprising content depicting a video tutorial, and the physical core component being recorded in the video tutorial from a single viewpoint;
program instructions to generate a three-dimensional representation of the physical core component associated with the request; and
program instructions to play the video tutorial on a display and render the generated three-dimensional representation of the physical core component over the physical core component in the display of the video tutorial, wherein a user can manipulate the generated three-dimensional representation of the physical core component in the display of the video tutorial.

16. The computer system of claim 15, wherein the request includes search parameters received from a user.

17. The computer system of claim 15, wherein source material includes metadata associated with a media file, text descriptions associated with the media file, objects depicted in the media file, and interactions depicted in the media file.

18. The computer system of claim 15, wherein the program instructions stored on the one or more computer readable storage media further comprise:
program instructions to move the generated three-dimensional representation corresponding to one or more interactions depicted in the video tutorial of the source material.

19. The computer system of claim 15, wherein the program instructions stored on the one or more computer readable storage media further comprise:
program instructions to move the generated three-dimensional representation corresponding to only a portion of interactions depicted in the source material until such time when the user replicates the movements depicted in the video tutorial of the source material.

20. The computer system of claim 15, wherein the program instructions stored on the one or more computer readable storage media further comprise:
program instructions to generate a search query for additional source material based on an identified core component from either the source material or from an identified physical component associated with the user.

* * * * *